Nov. 11, 1952   F. C. WARNE   2,617,343
REVERSIBLE ROTARY IMPLEMENT
Filed July 18, 1946   2 SHEETS—SHEET 1
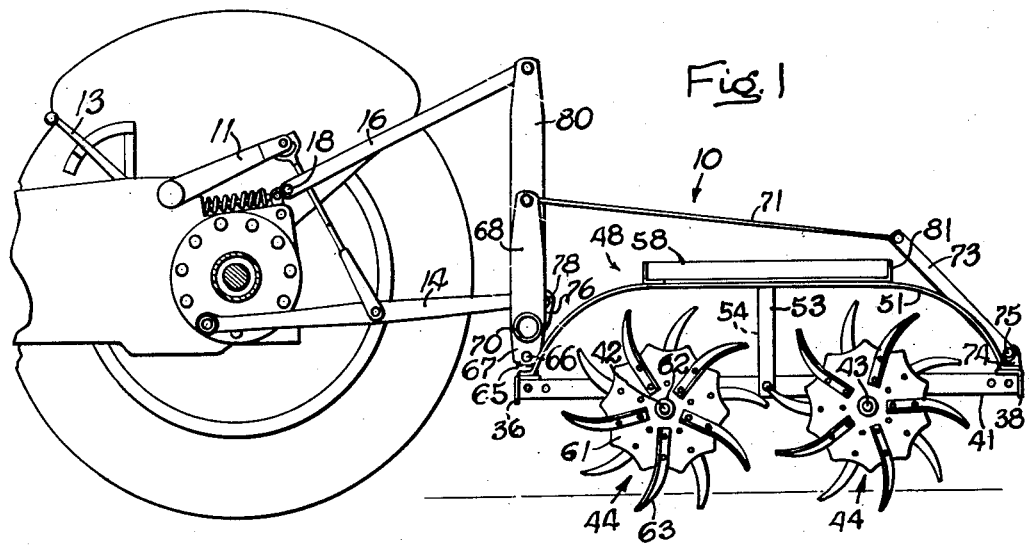
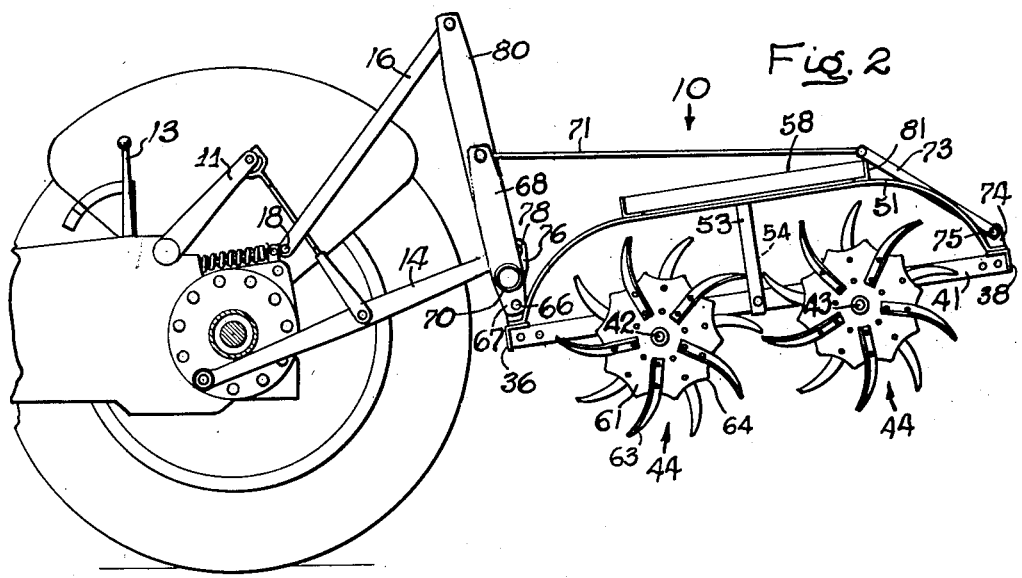
INVENTOR
Frederick C. Warne
Carlson, Pitzner, Hubbard & Hoefer
ATTORNEYS Nov. 11, 1952  F. C. WARNE  2,617,343
REVERSIBLE ROTARY IMPLEMENT
Filed July 18, 1946  2 SHEETS—SHEET 2
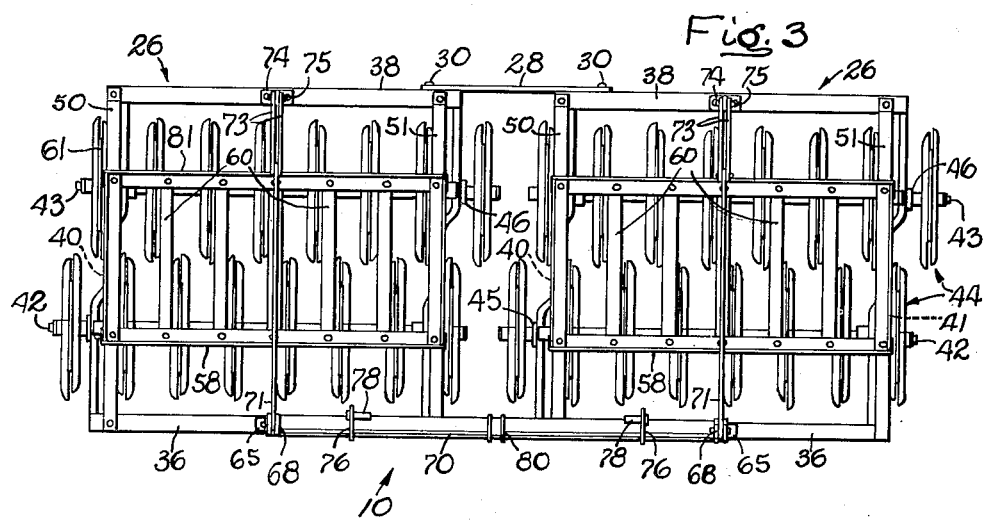
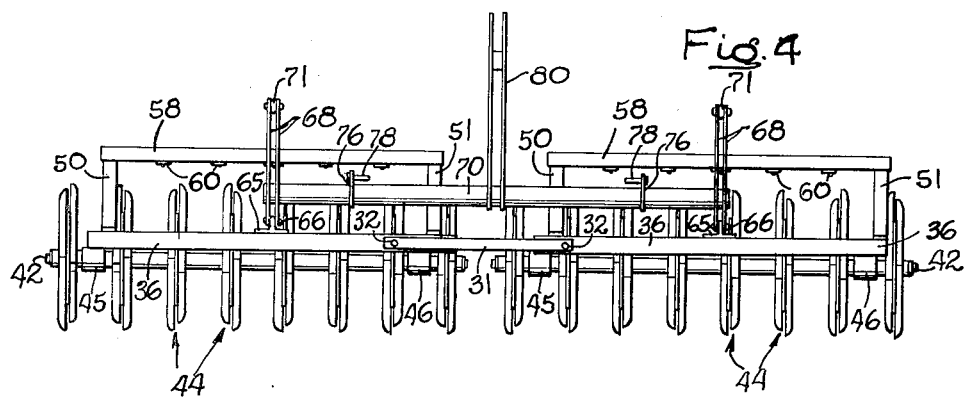
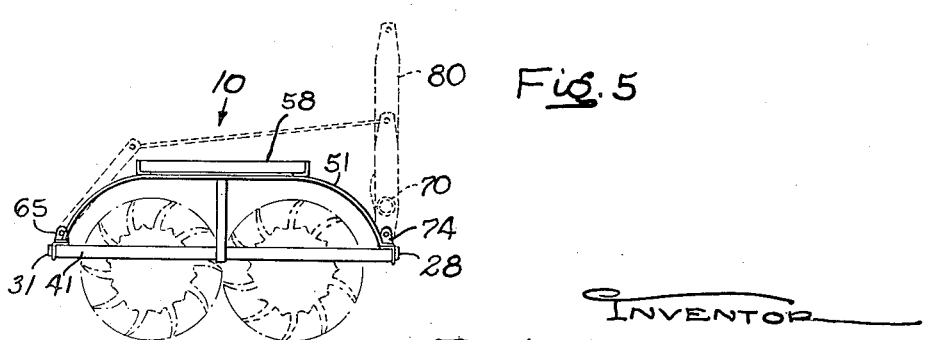
INVENTOR
Frederick C. Warne
Carlson Pitzner Hubbard & Wolfe
ATTORNEYS Patented Nov. 11, 1952

2,617,343

UNITED STATES PATENT OFFICE 2,617,343

REVERSIBLE ROTARY IMPLEMENT

Frederick C. Warne, Galveston, Tex., assignor to Farm Tools, Inc., Mansfield, Ohio, a corporation of Indiana Application July 18, 1946, Serial No. 684,563

6 Claims. (Cl. 97—50)

The present invention pertains to tractor drawn implements and to a novel and improved draft and supporting mechanism adapted to be embodied in the same.

The general aim of the invention is to provide in a tractor drawn rotary hoe or similar implement an improved connecting mechanism for hitching the same to a tractor to afford not only proper application of draft and the free following of ground contours while working, but also bodily raising and suspension of the implement for nonworking transport.

More particularly stated, it is an object of the invention to provide a tractor drawn rotary hoe embodying an improved arrangement for connecting the same for operation from a horizontally spaced pair of power operated tension links trailing pivotally from the rear end of a tractor and a coacting third or compression link disposed on the tractor above such pair. Such linkage is, for example, commonly provided on tractors equipped with the well known "Ferguson" system.

Another object is to provide an implement of the general character set forth which embodies a plurality of sections or gangs arranged side by side and all adapted to be connected to a tractor by a single connecting mechanism with which they are incorporated, but with full freedom of lateral movement of the sections relative to each other.

Still another object is to provide a rotary hoe which may readily be reversed with respect to the tractor to provide different tillage characteristics without in any way affecting the operation of the draft linkages or lifting mechanism.

A still further object is to provide lifting means in a tractor-supportable implement in which the overhanging weight thereof is counteracted in an efficient and improved manner.

Further objects and advantages of the invention will become apparent as the following description proceeds, taken in connection with the accompanying drawings in which:

Figure 1 is a side elevation of a tractor drawn rotary hoe incorporating the present invention, the same being shown applied to a tractor and with the rear end portion of the tractor shown fragmentarily, the hoe members being in the lowered or working position.

Fig. 2 is a side elevation of the tractor drawn rotary hoe of Fig. 1 with the hoe assembly in the elevated or non-working transport position.

Fig. 3 is a plan view of the rotary hoe embodying the present invention, such implement in this instance being composed of two frames or sections.

Fig. 4 is a view in elevation of the implement shown in Fig. 3 as viewed from the tractor.

Fig. 5 is a view in elevation showing the hoe in lowered or working position but with the frames reversed and the hoe fingers curved oppositely as compared to Figs. 1 and 2.

While the invention is susceptible of various modifications and alternative constructions, I have shown in the drawings and will here describe in detail certain preferred embodiments, but it is to be understood that I do not intend to limit the invention to the specific forms disclosed but intend to cover all modifications and alternative constructions falling within the spirit and scope of the invention as expressed in the appended claims.

Referring more particularly to the drawings, the invention has been shown in Fig. 1 as applied to a tractor drawn rotary hoe designated generally as 10. The tractor itself may, of course, take a variety of forms and that illustrated herein was chosen simply as being one of well known commercial design including a power operated lift means, for example, that disclosed in Henry George Ferguson Patent No. 2,118,180, issued May 24, 1938. In such structure arms 11 may be raised and lowered under the control of a lever 13 to determine the level of a pair of trailing tension links 14. A third or compression link 16 is pivotally mounted at 18 centered above the links 14, the upper and lower links forming opposite sides of what is, in effect, a parallelogram type of linkage.

The specific form of rotary hoe 10 illustrated embodies a plurality of sections or gangs (here shown as two) disposed side by side and comprising respective reinforced supporting frames 26. The two frames are identical in construction, and in the discussion which follows like reference numerals will apply to like parts in each of the frames. To facilitate passage of the implement over rough or uneven ground, the frames 26 are pivotally connected to each other for relative transverse tilting movement about longitudinal generally horizontally extending axes. For that purpose a strap 28 is connected to pivotally join the rear edges of the frames 26, being connected thereto by bolts 30 or the like. A similar strap 31 joins the front edges of the frames 26, being connected thereto by bolts 32. When thus interconnected, the frames 26 form a unit which, by reason of improved hitch means to be detailed, may be bodily reversed with respect to the tractor and the associated intermediate members to provide different tillage characteristics.

Each of the frames includes a front edge member 36, a rear edge member 38, a first side member 40 and a second side member 41. Extending transversely of the frames 26 and joining the side members 40, 41 are shafts 42, 43 which carry disc-like hoe members 44. The shafts are journalled in bearings 45, 46 which depend from the side members 40 and 41, respectively.

In order to provide rigidity and to serve as a support for weight or ballast, the frames 26 carry superstructures indicated generally at 48. In the present embodiment such superstructures include arched members 50 and 51 which interconnect the front and rear edge members, respectively, together with central supporting members 53 and 54 which are rigidly fastened to the side members 40 and 41, respectively, and extend upwardly into contact with the central portions of the arch members. Supported on the arch members 50 and 51 are shallow containers consisting of an agle iron frame 58 having latticework bottoms composed of strips 60 which, together with the frame 58, serve to support any additional weight required under various soil conditions. The edge of the frame 58, as will be more fully detailed, serves also as an elevated stop which is useful in the raising of the implement from the ground.

Each of the hoe members 44 includes a disc 61 mounted on a hub 62. Each of the discs 61 carries a plurality of generally radially-extending fingers 63 which have tips curved in the same direction. Ordinarily the fingers may be constructed of angle iron, and for purposes of convenience half of the fingers may be mounted on one side of the disc while the remaining half of the fingers are mounted on the opposite side of the disc and arranged alternately. If desired the disc may include points 64 to facilitate breakage of any lumps of earth which may lodge between adjacent fingers.

Extending across the front end of the frame 26 and lying adjacent the front edge members 36 and at a somewhat higher level is a transverse drawbar 70 of heavy and rigid tubular form. The frames 26 are individually connected to this drawbar in a manner to leave them free to tilt laterally with respect to each other and also to tilt or pitch in a fore and aft direction relative to the drawbar as they pass over the ground, although the frames are restrained against any substantial lateral swinging motion, in a horizontal plane relative to the drawbar. For such purpose each of the forward edge members 36 is provided with an upwardly extending apertured bracket 65. Each of the brackets 65 is connected by a pivot pin 66 with the lower end or projection 67 of a corresponding upright arm 68 which is rigidly fixed intermediate its ends with the drawbar 70. Each of the upright arms 68 consists, in the present instance, of a pair of closely spaced plates or bars between the lower ends of which the apertured brackets 65 are received.

The upper ends of the arms 68 are connected to the rear portions of the implement sections or gangs in such a manner that upon lifting of the drawbar 70, lifting force will be applied to the rear ends of the sections, as well as to the front ends, thus effecting bodily lifting of the implement as a whole. For that purpose pull rods 71 are pivotally connected to the upper ends of the arms 68 and extend rearwardly from the latter. The rear ends of the pull rods 71 are pivotally connected to the upper ends of a pair of links 73 which extend generally upwardly and forwardly from the rear edge members 38 to which they are attached by means of brackets 74 and securing pins 75. The bottom ends of the links 73 are pivotally attached to the edge members 38 by means of brackets 74 which are apertured to receive pins 75.

With the implement on the ground, as shown in Fig. 1, the length of the rods 71 is such that the links 73 are free floating and therefore substantially ineffective to restrain movement of the implement. This insures freedom of limited fore and aft tilting of the frame 26 relative to the drawbar while the implement is moving along the ground in working position.

Rigidly attached to the drawbar at points spaced laterally a distance appropriate to the lateral spacing of the links are short generally upright arms 76 which have detachable pivotal connections 78 for engaging the trailing ends of the links 14. The drawbar 70 is, on the other hand, connected to the upper or compression link 16 through a central upright mast or arm 80, consisting of a pair of closely spaced bars or plates rigid with the center of the drawbar.

In order to put the rotary hoe to its various uses, it may be necessary to run it with the tips of the fingers curved forwardly into the ground (as in Fig. 1) under some circumstances or backwardly at the will of the operator. Accomplishing such reversal has in the past required an elaborate and complicated supporting framework with the rotating means built in. Alternatively, where a less expensive and simpler structure is desired, it has been necessary for the operator to practically disassemble and reassemble the machine, obviously a time consuming and expensive operation. In the present device both of the latter difficulties are avoided and reversal of each of the frames 26 may be accomplished easily and quickly. It will be noted that applicant's improved structure involves coupling the drawbar and associated linkages to the frames in but four places, namely, at the brackets 65 at the front of each frame and at brackets 74 at the rear of each frame. Furthermore, it will be noted that the brackets 65 and 74 are longitudinally alined. Since the frames 26 are therefore symmetrical, it is merely necessary to remove the pins 66 and 75, and connect the drawbar assembly oppositely to the frames by engaging the pins 66 with brackets 74 and pins 75 with brackets 65. This can be quite easily done while the drawbar assembly is carried by the tractor whereby no manual labor is involved. Fig. 5 shows the appearance of the device with the hoe members oriented in the opposite direction as compared to Figs. 1 and 2.

As to the operation of the apparatus described, it may be assumed first of all that the tractor is moving forward and that the quadrant lever 13 is in the lowered position so that the lifter arms 11, together with the tension links 14 are free to swing downward to the position shown in Fig. 1. In such case the weight of the implement 10 pulls the links 14 downward so that the implement rests on the ground substantially in the working position. As the tractor moves forward, the implement is pulled along the ground, riding on the fingers 63 of the hoe members. Upon steering the tractor to the right or to the left the implement is trailed accurately behind it. If the ground is rough or uneven, however, the frames 26, being interconnected through pivots 30, 32, are free to tilt relative to each other and also to tilt in a fore and aft position relative to the drawbar. Such motion is unimpeded by the tension transmitting rods 71 in view of the fact that the upwardly extending links 73 are free floating.

When the operator desires to lift the implement 10 into the transport position shown in Fig. 2, either when the tractor is in motion or at rest, he has only to pull back on the control lever 13 of the hydraulic power lift. Operation of the lift causes the raising of the lifting arms 11 and the lower links 14. As the links 14 rise, they carry with them the drawbar 70 and the attached forward end of the implement. Because of the relative length of the uper links 16 and the lower links 14 and their place of pivoting, upward movement of the lower link also causes the drawbar 70 to rotate in a direction toward the tractor (counterclockwise as viewed in Figs. 1 and 2).

During the initial portion of the rising movement of the drawbar 70, the rear end of the implement will tend to sag or droop slightly with respect to the drawbar and about the pivots 66. This results in movement of the vertical links 73 toward the implement frame, such movement continuing until the links reach stops placed in the respective paths of movement. In the present instance the rearmost edges 81 of the frames 58 serve as stops. After contact of the links 73 and the edges 81, continued upward motion of the drawbar applies a lifting force in tension through the rods 71 to the rear portion of the implement so that the implement is lifted bodily into the transport position shown (Fig. 2).

Prior to contact of the links 73 there will be a certain amount of looseness in the linkage which enables the implement to move flexibly over the ground. After contact, however, the looseness or play is taken up by the weight of the suspended implement, and both of the implement frames 26 become substantially rigid with respect to the drawbar. Such rigidity is of practical importance in the transporting of the implement, locking the implement under such condition against unwanted flexibility and play.

I claim as my invention:

1. In a ground working implement for a tractor having vertically spaced upper and lower links trailingly pivoted on its rear end portion for vertical motion of the same by a power unit on the tractor, the combination of a generally horizontal frame having ground working means thereon, a transverse drawbar adjacent the front edge of said frame and pivotally connected thereto, a pivot connection on said drawbar for detachably connecting said lower links, a mast rigidly fixed to said drawbar for detachable connection at its upper end to said upper link, a generally upstanding link pivotally connected to the rear portion of said frame, an upstanding arm rigidly fixed to said drawbar in substantial lateral alinement with said upstanding link, a generally horizontal link interconnecting the upper portions of said upstanding link and said upstanding arm, and a stop on said frame in the path of movement of said upstanding link to limit the forward rotation of the latter incident to droop of the frame about said drawbar, thereby enabling bodily elevation of the rear end of said frame to transport position upon elevation of said drawbar.

2. In a ground working implement for a tractor having vertically spaced upper and lower links trailingly pivoted on its rear end portion for vertical motion of the same by a power unit on the tractor, the combination of a generally horizontal frame having ground working means thereon, a transverse drawbar adjacent the front end of said frame and pivotally connected thereto, a pivot connection on said drawbar for detachable connection of said lower links, a mast rigidly fixed to said drawbar for detachable connection at its upper end to said upper link, a plurality of understanding arms rigidly fixed to said drawbar and having portions extending both upwardly and downwardly from the latter, duplicate sets of brackets fixed to the front and rear edges respectively of said frame and arranged with individual ones of said brackets spaced to correspond to the spacing of individual ones of said arms for interchangeable connection of one set or the other with said arms, a pivot connection associated with the depending portions of said arms respectively for detachably engaging the brackets of a selected set, upwardly extending links at the rear edge of said frame having a detachable pivot connection with the brackets of the remaining set thereof, generally horizontal links interconnecting the upper portions of said upstanding arms and of said upstanding links respectively, and stops on said frame in the path of movement of said upstanding links to limit the forward rotation of the latter incident to droop of the frame about the drawbar, thereby enabling bodily elevation of the rear end of said frame to transport position upon elevation of said drawbar.

3. In a ground working implement for a tractor having vertically spaced upper and lower links trailingly pivoted on its rear end portion for vertical motion of the same by a power unit on the tractor, the combination of a plurality of generally horizontal frames having ground working means thereon, a transverse drawbar adjacent the front end of said frame and pivotally connected thereto, a pivotal connection on said drawbar for detachable engagement with said lower links, a mast rigidly fixed to said drawbar for detachable connection at its upper end to said upper link, a plurality of upstanding arms rigidly fixed to said drawbar, brackets fixed to the front edges and rear edges respectively of said frames, individual ones of said brackets being spaced to correspond to the spacing of individual ones of said arms, depending pivot connections on said drawbar vertically alined with respective ones of said arms for horizontal hinged engagement with adjacent ones of said brackets, upwardly extending links at the rear edge of said frames respectively for pivotally engaging adjacent ones of said brackets thereon, tension transmitting connections interconnecting the upper portions of said upstanding arms and of said upstanding links respectively so arranged that the latter swing forwardly as an incident to droop of the frames about said drawbar, and stops on said frames to limit the forward rotation of said upstanding links thereby to limit drooping movement and to enable bodily elevation of the rear ends of said frames to transport position upon elevation of said drawbar, the brackets associated with each of said frames being alined to allow reversal of said frames on said drawbar.

4. In a reversible ground working implement having different tillage characteristics depending upon the direction of travel and for connection to a tractor having vertically spaced upper and lower links pivoted on its rear end portion, the combination comprising a generally horizontal frame, a transverse drawbar adjacent the front edge of said frame and having a mast rigidly fixed thereon for detachable connection at its upper end portion to said upper link, said drawbar having means for detachably supporting the same on the tractor draft links, said drawbar having spaced pivot projections thereon, first and second sets of brackets mounted on the front and rear edges of said frame respectively, the brackets comprising each set being spaced to correspond with the projections on the drawbar, said brackets being so constructed as to provide a horizontal hinge connection with the latter to enable free fore and aft rocking of said frame with respect to said tractor and drawbar with either said first or second set of brackets connected to the drawbar.

5. In a reversible ground working implement having different tillage characteristics depending upon the direction of travel, said implement being adapted for operative connection with a tractor power lift means whereby the implement may be raised or lowered between a transport position free of the ground and an operative position in which the implement rests on the ground, said implement including the combination of an implement frame carrying soil working members adapted to operate when moved through the soil in reversed directions, an elongated horizontal drawbar, means for detachably connecting said drawbar to said power lift means for bodily raising and lowering thereby, pivot connections for detachably connecting said drawbar to either of two opposite sides of said frame with said drawbar extending along and adjacent the end of the frame to which it is connected, an upright arm rigidly attached to said drawbar and designed for swinging movement throughout an angle upon shifting of said drawbar by said power lift means, a pull rod pivotally connected at its forward end to the upper end of said upright arm, a generally upwardly extending link pivotally connected to the rear end of said frame remote from said drawbar and pivotally connected to the rear end of said pull rod, there being a limit stop on said frame positioned in the path of movement of said link for engaging the latter upon raising of said drawbar and upon a predetermined pivotal movement of said link to cause the link and pull rod to assume fixed positions with respect to said frame for bodily transport of the implement.

6. In a reversible ground working implement having different tillage characteristics depending upon the direction of travel, said implement being adapted for operative connection with a tractor power lift means whereby the implement may be raised or lowered between a transport position free of the ground and an operative position in which the implement rests on the ground, said implement including the combination of an implement frame carrying soil working members adapted to operate when moved through the soil in reversed directions, an elongated drawbar, a detachable connection for selectively hingedly connecting said drawbar to either end of said frame with the drawbar extending co-extensively in close proximity to the end of the frame to which it is connected, an upwardly extending arm rigidly mounted on said drawbar, a pull rod pivotally connected at its forward end to the upper end of said arm and extending rearwardly over the frame, a link pivotally connected at its forward end to the rear end of said pull rod, a second detachable connection for selectively connecting the rear end of said link to either end of said frame, and means for connecting said drawbar with the tractor power lift.

FREDERICK C. WARNE.

REFERENCES CITED

The following references are of record in the file of this patent:

UNITED STATES PATENTS

| Number | Name | Date |
|---|---|---|
| Re. 22,627 | McKay | Apr. 3, 1945 |
| D. 134,347 | Rude | Nov. 17, 1942 |
| 1,405,860 | Olson | Feb. 7, 1922 |
| 2,333,586 | Rude | Nov. 2, 1943 |
| 2,336,152 | Rude | Dec. 7, 1943 |
| 2,345,741 | Foulke | Apr. 4, 1944 |

FOREIGN PATENTS

| Number | Country | Date |
|---|---|---|
| 554,033 | Great Britain | June 16, 1943 |